United States Patent
Liberg et al.

(10) Patent No.: US 11,997,593 B2
(45) Date of Patent: May 28, 2024

(54) ENHANCED CELL SELECTION FOR NON-TERRESTRIAL NETWORKS

(71) Applicant: Telefonaktiebolaget LM Ericsson (PUBL), Stockholm (SE)

(72) Inventors: Olof Liberg, Enskede (SE); Helka-Liina Määttänen, Helsinki (FI); Xingqin Lin, Santa Clara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 335 days.

(21) Appl. No.: 17/427,442

(22) PCT Filed: Jan. 29, 2020

(86) PCT No.: PCT/IB2020/050716
§ 371 (c)(1),
(2) Date: Jul. 30, 2021

(87) PCT Pub. No.: WO2020/165675
PCT Pub. Date: Aug. 20, 2020

(65) Prior Publication Data
US 2022/0150818 A1    May 12, 2022

Related U.S. Application Data

(60) Provisional application No. 62/804,921, filed on Feb. 13, 2019.

(51) Int. Cl.
*H04W 4/00*    (2018.01)
*G01S 19/25*    (2010.01)
(Continued)

(52) U.S. Cl.
CPC .......... *H04W 48/20* (2013.01); *G01S 19/254* (2013.01); *H04W 56/009* (2013.01); *H04W 84/06* (2013.01)

(58) Field of Classification Search
CPC ..... H04W 48/20; H04W 56/00; H04W 84/06; G01S 19/25; G01S 19/254
See application file for complete search history.

(56) References Cited

U.S. PATENT DOCUMENTS 7,663,540 B2 * 2/2010 Oda ................. G01S 19/48
                                                701/470
10,117,067 B2   10/2018 Stubbs
(Continued)

FOREIGN PATENT DOCUMENTS

WO    2011 041753 A2    4/2011
WO    2017097997 A1    6/2017
(Continued)

OTHER PUBLICATIONS

3GPP TR 38.811 v15.0.0; Technical Report; 3rd Generation Partnership Project; Technical Specification Group Radio Access Network; Study on New Radio (NR) to support non terrestrial networks (Release 15)—Jun. 2018.
(Continued)

Primary Examiner — Elisabeth Benoit Magloire
(74) Attorney, Agent, or Firm — Sage Patent Group

(57) ABSTRACT

A wireless device obtains one or more Non-Terrestrial Network (NTN) related metrics for each of a plurality of cells in the NTN and selects a cell for camping based at least in part on the one or more NTN related metrics. The one or more NTN related metrics comprise: a geographical distance between the wireless device and a reference point; a distance between the wireless device and one or more satellites serving each cell; a round-trip time (RTT) offered by the one or more satellites serving each cell; RTT variations in each cell; a requirement to pre-compensate the RTT by means of Global Navigation Satellite System (GNSS) measurements; a velocity of the satellite serving each cell; an angle of elevation between the device and the satellite(s) serving
(Continued)

---

1010
For each of a plurality of cells in a non-terrestrial network, obtaining one or more NTN-related metrics the one or more NTN-related metrics comprising one or more of:
- a geographical distance between the wireless device and a reference point associated with a respective cell;
- a geographical distance between the wireless device and a reference point associated with an Synchronization Signal Block (SSB) beam of a respective New Radio (NR) cell;
- a distance between the wireless device and the one or more satellites serving each cell;
- a round-trip time (RTT) offered by the one or more satellites serving each cell;
- round-trip time (RTT) variations in each cell;
- a requirement to pre-compensate the RTT by means of GNSS measurements;
- a velocity of the satellite serving each cell;
- an angle of elevation between the device and the satellite(s) serving each cell;
- a Doppler shift induced by the satellite serving each cell;
- a tracking area code broadcasted by the cell; and
- a signal strength/quality offset.

↓

1020
Selecting a first cell of the plurality of cells as a cell for camping based at least in part on the one or more NTN-related metrics.

each cell; a Doppler shift induced by the satellite serving each cell; a tracking area code broadcasted by the cell; and/or a signal strength/quality offset.

18 Claims, 13 Drawing Sheets

(51) Int. Cl.
*H04W 48/20* (2009.01)
*H04W 56/00* (2009.01)
*H04W 84/06* (2009.01)

(56) References Cited

U.S. PATENT DOCUMENTS

| | | | | |
|---|---|---|---|---|
| 2003/0008652 A1* | 1/2003 | Jochim | H01Q 1/246 | 455/430 |
| 2007/0279281 A1* | 12/2007 | Oda | H04W 64/00 | 342/450 |
| 2009/0160705 A1* | 6/2009 | Matsuzaki | G01S 19/14 | 342/357.66 |
| 2009/0274113 A1* | 11/2009 | Katz | H04B 7/18513 | 342/357.31 |
| 2015/0355334 A1* | 12/2015 | Stubbs | G01S 19/14 | 342/357.395 |
| 2016/0057697 A1* | 2/2016 | Sirotkin | H04W 36/008375 | 370/331 |
| 2016/0234759 A1* | 8/2016 | Kubota | H04W 48/14 | |
| 2016/0360438 A1* | 12/2016 | Yiu | H04W 48/20 | |
| 2019/0011569 A1* | 1/2019 | Faragher | G01S 19/246 | |
| 2019/0227179 A1* | 7/2019 | Afzal | G01S 19/41 | |
| 2020/0186236 A1* | 6/2020 | Wang | H04W 84/06 | |
| 2022/0150972 A1* | 5/2022 | Turtinen | H04B 7/18558 | |
| 2023/0022283 A1* | 1/2023 | Wigard | H04W 36/0083 | |

FOREIGN PATENT DOCUMENTS

| | | |
|---|---|---|
| WO | 2017 189862 A1 | 11/2017 |
| WO | 2018 052744 A2 | 3/2018 |
| WO | 2018 185657 A1 | 10/2018 |

OTHER PUBLICATIONS

3GPP TS 36.304 v15.0.0; Technical Specification; 3rd Generation Partnership Project; Technical Specification Group Radio Access Network; Evolved Universal Terrestrial Radio Access (E-UTRA); User Equipment (UE) procedures in idle mode (Release 15)—Jun. 2018.

3GPP TS 38.304 v15.0.0; Technical Specification; 3rd Generation Partnership Project; Technical Specification Group Radio Access Network; NR; User Equipment (UE) procedures in Idle mode and RRC Inactive state (Release 15)—Jun. 2018.

PCT Notification of Transmittal of the International Search Report and the Written Opinion of the International Searching Authority, or the Declaration issued for International application No. PCT/IB2020/050716—dated Apr. 6, 2020.

3GPP TSG RAN WG3 Meeting #101; Gothenburg, Sweden; Source: Hughes; Title: NR-NTN: Paging in NGSO Satellite Systems (R3-184403)—Aug. 20-24, 2018.

PCT International Search Report issued for International application No. PCT/IB2020/050716—dated Apr. 6, 2020.

PCT Written Opinion of the International Searching Authority issued for International application No. PCT/IB2020/050716—dated Apr. 6, 2020.

European Office Action for European Patent Application No. 20704592.3, dated Oct. 30, 2023, 5 pages.

* cited by examiner

1010

For each of a plurality of cells in a non-terrestrial network, obtaining one or more NTN-related metrics the one or more NTN-related metrics comprising one or more of:

- a geographical distance between the wireless device and a reference point associated with a respective cell;
- a geographical distance between the wireless device and a reference point associated with an Synchronization Signal Block (SSB) beam of a respective New Radio (NR) cell;
- a distance between the wireless device and the one or more satellites serving each cell;
- a round-trip time (RTT) offered by the one or more satellites serving each cell;
- round-trip time (RTT) variations in each cell;
- a requirement to pre-compensate the RTT by means of GNSS measurements;
- a velocity of the satellite serving each cell;
- an angle of elevation between the device and the satellite(s) serving each cell;
- a Doppler shift induced by the satellite serving each cell;
- a tracking area code broadcasted by the cell; and
- a signal strength/quality offset.

1020

Selecting a first cell of the plurality of cells as a cell for camping based at least in part on the one or more NTN-related metrics.

FIGURE 3

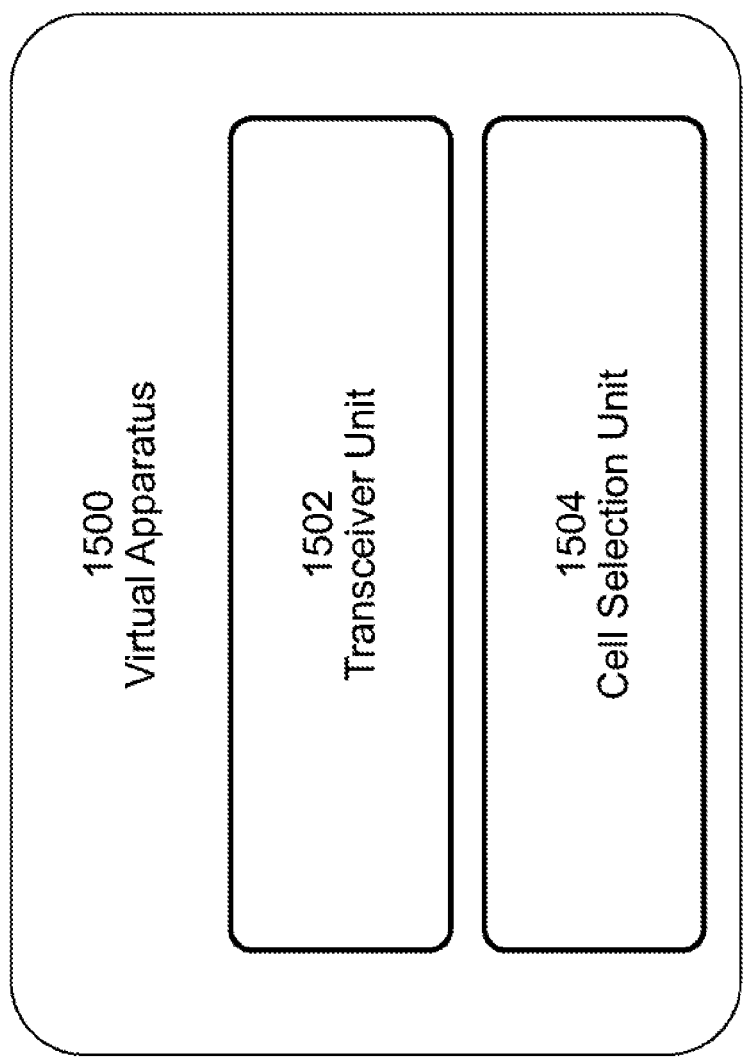

ENHANCED CELL SELECTION FOR NON-TERRESTRIAL NETWORKS

PRIORITY

This nonprovisional application is a U.S. National Stage Filing under 35 U.S.C. § 371 of International Patent Application Serial No. PCT/IB2020/050716 filed Jan. 29, 2020 and entitled "Enhanced Cell Selection for Non-Terrestrial Networks" which claims priority to U.S. Provisional Patent Application No. 62/804,921 filed Feb. 13, 2019 both of which are hereby incorporated by reference in their entirety.

BACKGROUND

The Third Generation Partnership Project (3GPP) Release 8 specified an Evolved Packet System (EPS). EPS is based on the Long-Term Evolution (LTE) radio network and the Evolved Packet Core (EPC). EPS was originally intended to provide voice and mobile broadband (MBB) services, but it has continuously evolved to broaden its functionality. Since Release 13, the LTE specifications have included Narrowband Internet-of-Things (NB-IoT) and LTE-Machine Type Communication (LTE-M) to provide connectivity to massive machine type communications (mMTC) services.

3GPP Release 15 introduced the first release of the 5G system. The 5G system provides a new generation of radio access technology intended to serve various use cases, such as enhanced mobile broadband (eMBB), ultra-reliable and low latency communication (URLLC), and mMTC. 5G includes the New Radio (NR) access stratum interface and the 5G Core Network (5GC). The NR physical and higher layers have reused parts of the LTE specification and added components to support new use cases.

Non-Terrestrial Network (NTN)

In Release 15, 3GPP worked on a study item entitled "NR to support Non-Terrestrial Networks" to start preparing NR for operation in a Non-Terrestrial Network (NTN), which resulted in Technical Report (TR) 38.811. In Release 16, 3GPP worked on a study item entitled "Solutions for NR to support Non-Terrestrial Network" to continue preparing NR for operation in an NTN. In parallel, interest in adapting LTE for operation in NTN continues to grow, including some interest in preparing LTE-M and NB-IoT for operation in an NTN.

A satellite radio access network usually includes the following components:
  A satellite that refers to a space-borne platform.
  An earth-based gateway that connects the satellite to a base station or a core network, depending on the choice of architecture.
  Feeder link that refers to the link between a gateway and a satellite
  Service link that refers to the link between a satellite and a user equipment (UE).

Two popular architectures are the Bent pipe transponder and the Regenerative transponder architectures. In the first case, the base station is located on earth behind the gateway, and the satellite operates as a repeater forwarding the feeder link signal to the service link, and vice versa. In the second case the satellite is in the base station and the service link connects it to the earth-based core network.

Depending on the orbit altitude, a satellite may be categorized as low Earth orbit (LEO), medium Earth orbit (MEO), or geostationary (GEO) satellite.
  LEO: typical heights ranging from 250-1,500 km, with orbital periods ranging from 90-120 minutes.
  MEO: typical heights ranging from 5,000-25,000 km, with orbital periods ranging from 3-15 hours.
  GEO: height at about 35,786 km, with an orbital period of 24 hours.

Propagation Delay

The propagation delay is a primary physical phenomenon in a satellite communication system that differentiates the design from that of a terrestrial mobile system. For a bent pipe satellite network, the round-trip time (RTT) may, due to the orbit height, range from tens of milliseconds (ms) in the case of LEO to several hundreds of ms for GEO. In contrast, the round-trip delays catered for in a cellular network are typically limited to about 1 ms.

To handle the large RTT in an NR-based NTN, an interesting technique is to equip each UE with a Global Navigation Satellite System (GNSS) receiver. The GNSS receiver allows a UE to estimate its position and the universal time (UTC). The UE can also be pre-loaded (and updated when necessary) with the ephemeris of the satellite constellation which can be theoretical or actual, and feeder link delay information. The GNSS-equipped UE can compute the position and motion of the possible serving satellites to determine and/or estimate the round-trip time (RTT), delay variation, Doppler shift and angle of elevation to the satellite. The estimated RTT may be used to pre-compensate the timing used for the Physical Random Access Channel (PRACH) (e.g., Narrowband PRACH (NPRACH)) preamble transmission. This method can secure that the preamble transmission arrives within the satellite receiver preamble reception window.

Alternatively, or in addition to the previous technique, for cells of moderate size with a similar RTT across the entire cell, a common RTT component may be signalled by the network to the UEs in a cell. The UEs may then pre-compensate the (N)PRACH preamble transmission by this common RTT component to secure that the preamble transmission arrives within the satellite receiver preamble reception window.

Doppler Effects

In a terrestrial network, the base station is typically stationary, and accordingly, Doppler effects induced on the radio link typically stem from the mobility of the UEs. In an NTN, the satellite is moving in relation to the surface of the earth and may introduce a second Doppler offset or spread to the radio link in addition to that caused by the mobility of the UE.

This new Doppler component may be significant, especially in the case of LEO and MEO where it may be on the order of several tens or hundreds of kHz depending on the radio frequency being used. This doppler component may also be highly dependent on the angle of elevation between the UE and the satellite because the angle of elevation affects the relative velocity between the UE and the satellite.

Spotbeam

A communication satellite typically generates several beams over a given area. The footprint of a beam is usually in an elliptic shape, which has been traditionally considered as a cell. The footprint of a beam is also often referred to as a spotbeam. The footprint of a beam may move over the Earth's surface with the satellite movement or may be fixed to a position on Earth with some beam pointing mechanism used by the satellite to compensate for the motion of the satellite. The size of a spotbeam may depend on the system design and may range from tens of kilometers to a few thousands of kilometers. FIG. 1 shows an example of a satellite network with bent pipe transponders.

Cell Selection

3GPP Technical Specification (TS) 36.304 v15.0.0 defines two types of cell selection for LTE: (1) Initial Cell Selection, and (2) Stored Information Cell Selection.

Initial Cell Selection requires no prior knowledge of which radio frequency (RF) channels are Evolved Universal Terrestrial Radio Access (E-UTRA) or NB-IoT carriers. The UE shall scan all RF channels in the E-UTRA bands according to its capabilities to find a suitable cell. On each carrier frequency, the UE need only search for the strongest cell. Once a suitable cell is found this cell shall be selected.

Stored Information Cell Selection requires stored information of carrier frequencies, and optionally information on cell parameters, from previously received measurement control information elements or from previously detected cells. Once the UE has found a suitable cell the UE shall select it. If no suitable cell is found, then the Initial Cell Selection procedure shall be started.

3GPP TS 38.304 v15.0.0 defines the NR cell selection procedure, which can be said to align with the LTE procedures.

For both NR and LTE, suitability is determined by the so-called S-criterion which generally requires that both the signal strength (e.g., Reference Signal Received Power (RSRP)) and signal quality (e.g., Reference Signal Received Quality (RSRQ)) in a cell exceed a pair of broadcasted thresholds.

SUMMARY

There currently exist certain challenge(s). For example, existing 3GPP systems typically base cell selection on signal strength measurements (e.g., RSRP measurements) and do not consider NTN-specific aspects in the selection. Managing idle and connected mode mobility based only on signal strength measurements (e.g., RSRP measurements) may be challenging when beams covering adjacent cells overlap or when an NTN beam is wider than beams observed in a terrestrial network such that the NTN beam covers an area outside of the area defined by the served cell. In some cases, RSRP measurements across a set of multiple cells in an NTN network may display limited signal level variations due the typical line of sight conditions between the device and the satellite transmitters. As a result, a reliable cell selection ranking entirely on RSRP may be difficult to determine accurately. As another example, a satellite may move relative to the surface of the earth, inducing a significant Doppler component on the link. The suitability of a cell may be highly dependent on the Doppler shift, in addition to the signal strength. Another unaddressed issue is the increased round-trip time (RTT) in an NTN. While the RTT in a terrestrial network is upper bounded to 1 ms, the RTT in an NTN may range between tens of ms to hundreds of ms. It may also vary substantially across a cell and require that the devices are equipped with GNSS receivers. The cell suitability may also be dependent on this RTT and its cell specific variation.

Certain aspects of the present disclosure and their embodiments may provide solutions to these or other challenges. In particular, this disclosure contemplates several embodiments that incorporate NTN-specific aspects into the cell selection and cell suitability determination. For example, a doppler shift component from the movement of the satellite in the NTN may be accounted for in determining cell rankings/selections. As another example, the longer RTTs are accounted for in determining cell selection. As a result, certain embodiments adipate the 3GPP cell selection and cell suitability criteria to NTN operation and therefore, improve the cell selection procedure in an NTN.

According to certain embodiments, a UE equipped with a GNSS receiver may base its mobility at least in part on its geographical position. For example, instead of basing its mobility entirely on RSRP measurements, mobility may be based on its geographical position relative to a set of well-defined geographical positions corresponding to the cell centres in the NTN, as depicted in FIG. 2. A variety of solutions or considerations may be contemplated. For example, a location-based criterion may be considered in cell selection/reselection procedures, e.g., a UE is only permitted to camp on a cell that is within a certain distance. Further enhanced cell reselection procedures for NTN may also be contemplated.

There are, proposed herein, various embodiments which address one or more of the issues disclosed herein.

According to certain embodiments, a method performed by a wireless device comprises obtaining one or more NTN-related metrics for each of a plurality of cells in a non-terrestrial network. The method further comprises selecting a first cell of the plurality of cells as a cell for camping based at least in part on the one or more NTN-related metrics.

According to certain embodiments, a wireless device comprises power supply circuitry and processing circuitry. The power supply circuitry is configured to supply power to the wireless device. The processing circuitry is configured to obtain NTN-related metrics for each of a plurality of cells in a non-terrestrial network. The processing circuitry is further configured to select a first cell of the plurality of cells as a cell for camping based at least in part on the one or more NTN-related metrics.

According to certain embodiments, a computer program comprises instructions that, when executed on a computer, cause the computer to perform a method comprising obtaining one or more NTN-related metrics for each of a plurality of cells in a non-terrestrial network, and selecting a first cell of the plurality of cells as a cell for camping based at least in part on the one or more NTN-related metrics.

With respect to each of the above-described method, wireless device, and computer program, the one or more NTN-related metrics comprise one or more of:

a geographical distance between the wireless device and a reference point associated with a respective cell;

a geographical distance between the wireless device and a reference point associated with an Synchronization Signal Block (SSB) beam of a respective New Radio (NR) cell;

a distance between the wireless device and the one or more satellites serving each cell;

a round-trip time (RTT) offered by the one or more satellites serving each cell;

round-trip time (RTT) variations in each cell; a requirement to pre-compensate the RTT by means of Global Navigation Satellite System (GNSS) measurements;

a velocity of the satellite serving each cell; an angle of elevation between the device and the satellite(s) serving each cell; a Doppler shift induced by the satellite serving each cell;

a tracking area code broadcasted by the cell; and a signal strength/quality offset.

Each of the above-described method, wireless device, and computer program may include one or more additional features. For example, the method, wireless device, and/or computer program may include one or more of the following features:

In certain embodiments, the first cell is selected as the cell for camping based on one or more received signal strength (RSRP) measurements and/or one or more received signal quality (RSRQ) measurements.

In certain embodiments, the first cell is selected as the cell for camping based on comparing a geographical distance (the geographical distance between the wireless device and a reference point associated with the first cell) to a maximum acceptable distance. The first cell is selected as the cell for camping based at least in part on determining that the geographical distance between the wireless device and the reference point associated with the first cell is less than the maximum acceptable distance.

In certain embodiments, the first cell is selected as the cell for camping based on comparing a geographical distance (the geographical distance between the wireless device and a satellite serving the first cell) to a maximum acceptable distance. The first cell is selected as the cell for camping based at least in part on determining that the geographical distance between the wireless device and the satellite serving the first cell is less than the maximum acceptable distance.

In certain embodiments, the first cell is selected as the cell for camping based on comparing an RTT parameter associated with the first cell to an RTT threshold. The first cell is selected as the cell for camping based at least in part on determining that the RTT parameter associated with the first cell is less than the RTT threshold.

In certain embodiments, the first cell is selected as the cell for camping based on comparing a speed measure of a satellite serving the first cell to a speed measure threshold. The first sell is selected as the cell for camping based at least in part on determining that the speed measure of the satellite serving the first cell is below the speed measure threshold.

In certain embodiments, the first cell is selected as the cell for camping based on comparing an elevation angle between a satellite serving the first cell and the wireless device to an elevation angle threshold. The first sell is selected as the cell for camping based at least in part on determining that the elevation angle between the satellite serving the first cell and the wireless device is greater than the elevation angle threshold.

In certain embodiments, the first cell is selected as the cell for camping based on using the one or more NTN-related metrics to determine which cells of the plurality of cells are suitable for selection as the cell for camping. The first cell is selected as the cell for camping based on the first cell having the strongest signal strength of the cells that are suitable for selection as the cell for camping.

In certain embodiments, the first cell is selected as the cell for camping based on using the one or more NTN-related metrics to determine one or more cells suitable for selection as the cell for camping. The first cell is selected as the cell for camping based on the first cell being the first of the one or more cells determined to be suitable for selection as the cell for camping.

In certain embodiments, the first cell is selected as the cell for camping based on comparing the one or more NTN-related metrics associated with the first cell to the one or more NTN-related metrics associated with the other cells using the same carrier frequency as the first cell of the plurality of cells and determining that the one or more NTN-related metrics associated with the first cell satisfy at least one of the following:

shortest distance to a reference point associated with the cell;
shortest distance to a satellite serving the cell;
lowest RTT;
lowest RTT variation within the cell;
lowest satellite speed;
highest angle of elevation; or
lowest Doppler effect induced by a satellite serving the cell.

Certain embodiments allow a wireless device to use parameters specifically related to the Non-Terrestrial Network to select or reselect a cell. In particular, according to certain embodiments, a wireless device obtains one or more NTN-related parameters for a cell and based on those parameters determines whether to select the cell as the serving cell. In some embodiments, the one or more non-terrestrial network-related parameters are considered in addition to conventional signal strength/quality parameters. In some embodiments, the NTN-related parameter(s) are compared to respective thresholds to determine whether the cell is suitable to be a serving cell. For example, the wireless device may only select a cell that meets all, some, or at least one threshold for the NTN-related parameters. As another example, the wireless device may determine which cells are eligible and select the cell with the best signal quality/strength. According to another set of embodiments, a network node may transmit one or more NTN-related parameters for cells associated with the network node. Accordingly, a wireless device can determine whether one of the cells associated with the network node should be selected as the serving cell. In some embodiments, the network node is coupled with a satellite in a bent-pipe transponder configuration and in other embodiments, the network node is incorporated within a satellite.

Certain embodiments may provide one or more of the following technical advantage(s). For example, by considering parameters or conditions that are related to aspects of the NTN, the wireless device may make an improved cell selection/reselection. The NTN-related parameters may be used in addition to traditional measurements to determine which cell to select. As another example, the NTN-related parameters may be compared to corresponding thresholds to determine whether the associated cell is suitable for selection. Further, the thresholds may be fixed or configurable by the network, which may allow the network to adjust the tolerance for latency, bandwidth, etc., by changing the thresholds or address high traffic situations by setting different thresholds for different network nodes and/or cells.

BRIEF DESCRIPTION OF THE DRAWINGS

For a more complete understanding of the disclosed embodiments and their features and advantages, reference is now made to the following description, taken in conjunction with the accompanying drawings, in which:

FIG. 3 is a flowchart illustrating an example of a method performed by a wireless device, in accordance with certain embodiments.

FIG. 15 is a block diagram illustrating an example of a virtual apparatus, in accordance with certain embodiments.

DETAILED DESCRIPTION

Figure 1:
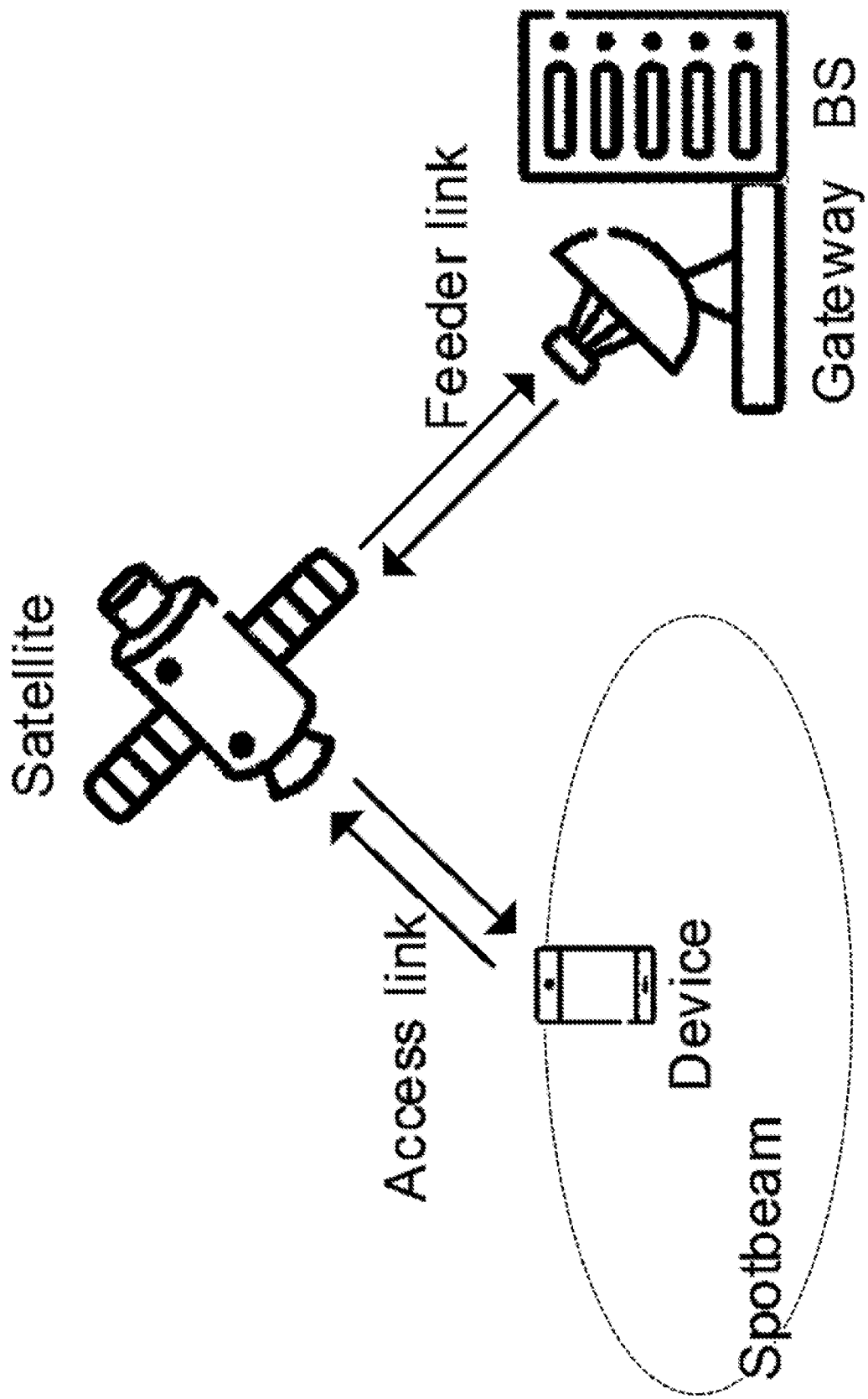
FIG. 1 illustrates an example of a satellite network with bent pipe transponders.
Figure 2:
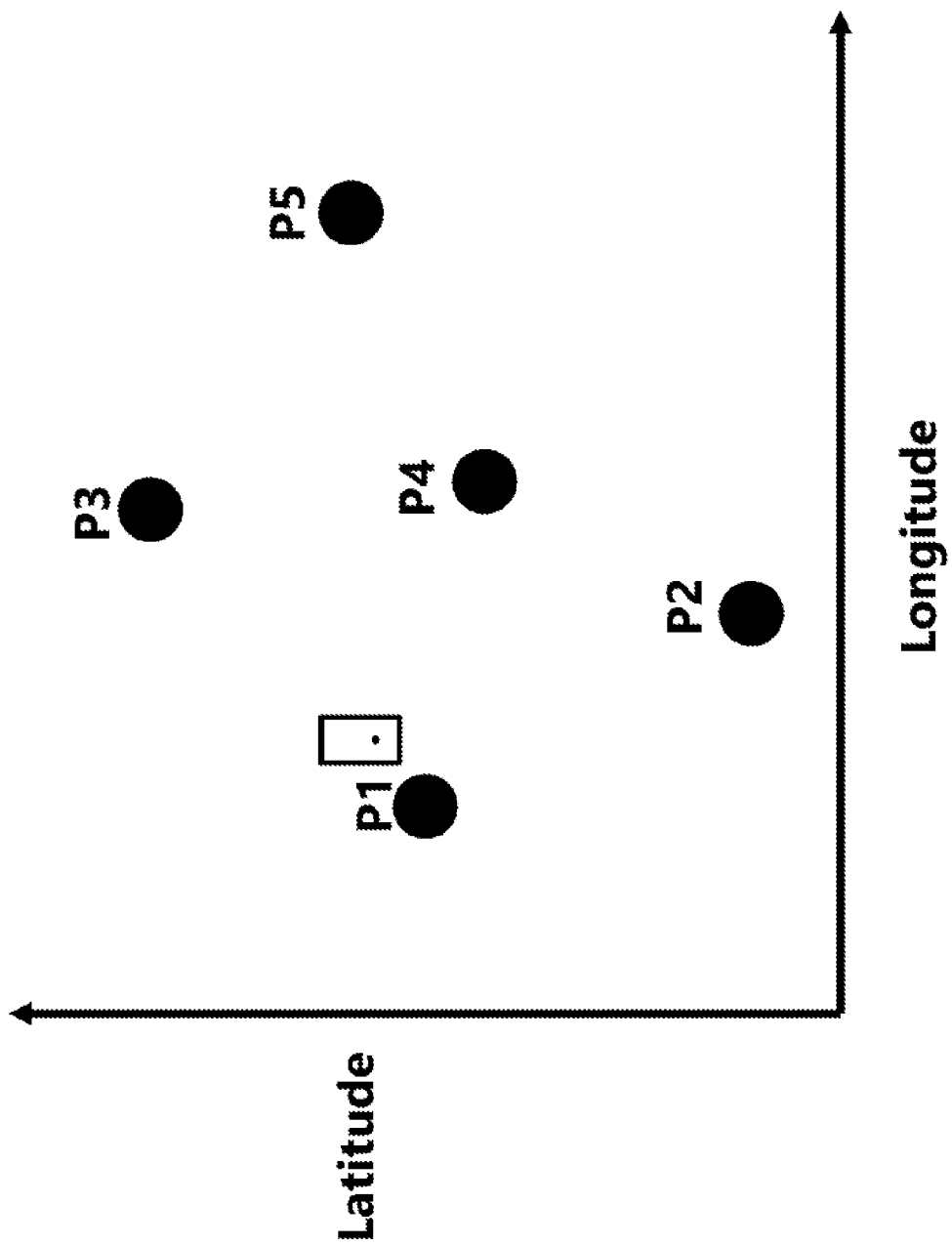
FIG. 2 illustrates an example of reference locations associated with spot beam.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Cell Selection and Suitability Metrics

In a cellular network the radio resource control (RRC) Idle/Inactive mode mobility cell selection procedure is conventionally based on RSRP and RSRQ measurements. In one embodiment, the RSRP/RSRQ metrics are complemented by one or more of the following metrics for determining the cell suitability:

The geographical distance between the wireless device and a reference point associated with a cell.

The geographical distance between the wireless device and a reference point associated with a Synchronization Signal Block (SSB) beam of an NR cell.

The distance between the wireless device and the satellite(s) serving each cell.

The round-trip time (RTT) offered by the satellite(s) serving each cell.

The round-trip time (RTT) variations in each cell.

A requirement on the UE to pre-compensate the RTT by means of GNSS measurements.

The velocity of the satellite serving each cell.

The angle of elevation between the wireless device and the satellite(s) serving each cell.

The Doppler shift induced by the satellite serving each cell.

Tracking area code broadcasted by the cell. For example, if cell selection would require the UE to perform a tracking area update, the UE applies an additional offset to the measured RSRP/RSRQ. Applying the offset diminishes the ping pong effect such that a cell selection (or reselection) causing a tracking area update is made only when necessary. The tradeoff of applying the offset is that a cell may be determined to be suitable at a lower RSRP/RSRQ value. The additional offset may be broadcasted in system information as a parameter Offset_tau.

The reference point associated with a cell may be tied to the satellite ephemeris data that may be stored at the UE or otherwise obtained by the UE, e.g., through signalling or other data gathering/receiving. In certain embodiments, the reference point associated to a cell corresponds to a geographical location, for example, the centre point of a cell defining spot beam. In certain embodiments, the reference point may move in case the satellite spot beams move. In other embodiments, the reference point may be fixed on earth, for example, in case of earth fixed spot beams.

Initial Cell Selection

In some embodiments, a wireless device, in addition to comparing RSRP and RSRQ to a set of configured thresholds, also compares one or more of the metrics listed in section above to a configured set of thresholds(s). A cell may be determined suitable if the measured quantity is below one or more of the configured thresholds (with respect to metrics for which being below a threshold represents a favorable condition) and/or above one or more of the configured thresholds (with respect to metrics for which exceeding a threshold represents a favorable condition). For example, a cell may be suitable if:

The distance to a reference point associated with a cell, or to the actual satellite, are below a highest acceptable distance;

The RTT to a cell or the RTT variations within a cell are below a highest acceptable RTT or RTT variation;

The satellite speed, and/or the Doppler induced by the satellite is/are below acceptable thresholds; or The elevation angle is above a configured acceptable threshold.

In certain embodiments, the satellite serving a cell indicates that only wireless devices equipped with GNSS receivers are permitted to camp on the cell. Accordingly, in some embodiments, the wireless device's GNSS capability may then be used to determine if the cell is suitable for the wireless device.

In certain embodiments, the wireless device is, for any given RF channel, only required to search for the RSRP strongest cell that supports a metric meeting configured threshold(s) for distance, RTT, RTT variation, satellite speed, angle of elevation and/or Doppler offset. For example, the wireless device may first evaluate cells for eligibility based on the configured thresholds related to the NTN considerations above and then select the eligible cell having the best RSRP.

In certain embodiments, the wireless device is, for any given RF channel, only required to search for the cell that supports:

The shortest distance to a reference point associated with the cell, or to the actual satellite;

The lowest RTT or the lowest RTT variations within the cell; or

The lowest satellite speed, the highest angle of elevation, and/or the lowest Doppler induced by the satellite.

In some embodiments, the wireless device does not directly consider RSRP and RSRQ to determine which cell to camp on or to select. For example, the wireless device may only select based on the NTN considerations discussed above.

Stored Information Cell Selection

A wireless device may store cell information including information related to the metrics listed in the "Cell selection and suitability metrics" section above for enhancing the cell selection/reselection.

In certain embodiments, the wireless device only stores cell information related to the aforementioned metrics for cells that support a metric meeting configured threshold(s) for distance, RTT, RTT variation, satellite speed, angle of elevation and/or Doppler offset. In addition, the wireless device may store, for each cell, the parameter Offset_tau.

Signalling Aspects

In some embodiments, the metrics used to determine cell suitability may be fixed in a 3GPP technical specification. The metrics can, alternatively or additionally, be broadcasted and/or configured per cell, per tracking area, per Radio Access Network (RAN) paging area, per system information validity area, or per Public Land Mobile Network (PLMN). Similarly, in some embodiments, the thresholds used to determine cell suitability may be fixed in a 3GPP technical specification. The thresholds can, alternatively or additionally, be broadcasted and/or configured per cell, per tracking area, per RAN paging area, per system information validity area, or per PLMN. For example, in some embodiments, both metrics and thresholds are fixed by a technical specification. In some embodiments, only one or more metrics and/or thresholds are fixed, and the other metrics/thresholds are broadcast and configured through different implementations. In some embodiments, all the NTN consideration metrics and thresholds are configured. In this manner, one or more of the NTN considerations may be incorporated into cell selection/reselection, thereby improving cell selection/reselection for wireless devices in NTNs.

FIG. 3 is a flowchart illustrating an example of a method performed by a wireless device, in accordance with certain embodiments. In certain embodiments, the method may be performed by wireless device 110 described with respect to FIG. 5, by UE 200 described with respect to FIG. 6, or by another wireless device described herein. In step 1010, the method comprises obtaining one or more NTN-related metrics for each of a plurality of cells in a non-terrestrial network. The one or more NTN-related metrics obtained in step 1010 may comprise any one or more of the following NTN-related metrics:

a geographical distance between the wireless device and a reference point associated with a respective cell;

a geographical distance between the wireless device and a reference point associated with an Synchronization Signal Block (SSB) beam of a respective New Radio (NR) cell;

a distance between the wireless device and the one or more satellites serving each cell;

a round-trip time (RTT) offered by the one or more satellites serving each cell;

round-trip time (RTT) variations in each cell; a requirement to pre-compensate the RTT by means of Global Navigation Satellite System (GNSS) measurements;

a velocity of the satellite serving each cell; an angle of elevation between the device and the satellite(s) serving each cell; a Doppler shift induced by the satellite serving each cell;

a tracking area code broadcasted by the cell; and a signal strength/quality offset.

In step 1020, the method comprises selecting a first cell of the plurality of cells as a cell for camping based at least in part on the one or more NTN-related metrics.

As an example, the first cell may be selected as the cell for camping based at least in part on determining that a geographical distance between the wireless device and the reference point associated with the first cell is less than a maximum acceptable distance.

As another example, the first cell may be selected as the cell for camping based at least in part on determining that the geographical distance between the wireless device and the satellite serving the first cell is less than a maximum acceptable distance.

As another example, the first cell may be selected as the cell for camping based at least in part on determining that the RTT parameter associated with the first cell is less than an RTT threshold.

As another example, the first cell may be selected as the cell for camping based at least in part on determining that the speed measure of the satellite serving the first cell is below a speed measure threshold.

As another example, the first cell may be selected as the cell for camping based at least in part on determining that the elevation angle between the satellite serving the first cell and the wireless device is greater than an elevation angle threshold.

As another example, the first cell may be selected based at least in part on one or more RSRP measurements and/or one or more RSRQ measurements. For example, in certain embodiments, the first cell is selected as the cell for camping based on using the one or more NTN-related metrics to determine which cells of the plurality of cells are suitable for selection as the cell for camping. The first cell is selected as the cell for camping based on the first cell having the strongest signal strength of the cells that are suitable for selection as the cell for camping.

In certain embodiments, the first cell is selected as the cell for camping based on using the one or more NTN-related metrics to determine one or more cells suitable for selection as the cell for camping. The first cell may then be selected as the cell for camping based on the first cell being the first (first in time) of the one or more cells determined to be suitable for selection as the cell for camping. For example, the wireless device may scan RF channels to find a suitable cell, and the wireless device need only search for a first suitable cell (e.g., once a suitable cell is found, that cell can be selected as the cell for camping, without having to continue searching for other suitable cells).

In certain embodiments, the first cell is selected as the cell for camping based on comparing the one or more NTN-related metrics associated with the first cell to the one or more NTN-related metrics associated with the other cells using the same carrier frequency as the first cell of the plurality of cells and determining that the one or more NTN-related metrics associated with the first cell satisfy at least one of the following:

shortest distance to a reference point associated with the cell;
    shortest distance to a satellite serving the cell;
    lowest RTT;
    lowest RTT variation within the cell;
    lowest satellite speed;
    highest angle of elevation; or
    lowest Doppler effect induced by a satellite serving the cell.

Figure 4:
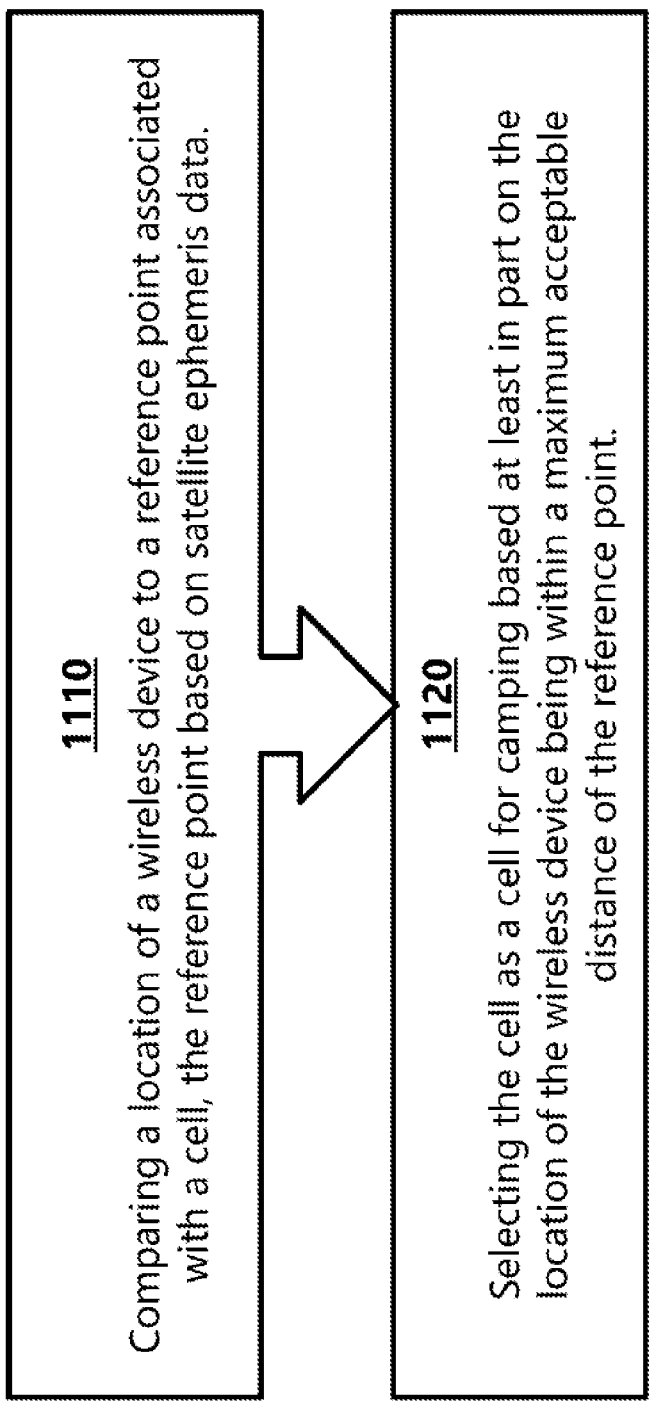
FIG. 4 is a flowchart illustrating an example of a method performed by a wireless device, in accordance with certain embodiments.

FIG. 4 is a flowchart illustrating an example of a method performed by a wireless device, in accordance with certain embodiments. At step 1110, the method comprises comparing a location of a wireless device to a reference point associated with a cell. The reference point is based on satellite ephemeris data. At step 1120, the method comprises selecting the cell as a cell for camping based at least in part on the location of the wireless device being within a maximum acceptable distance of the reference point. In certain embodiments, selecting the cell as the cell for camping may be further based on any other suitable criteria, such as any of the criteria described with reference to other embodiments of this disclosure.

Figure 5:
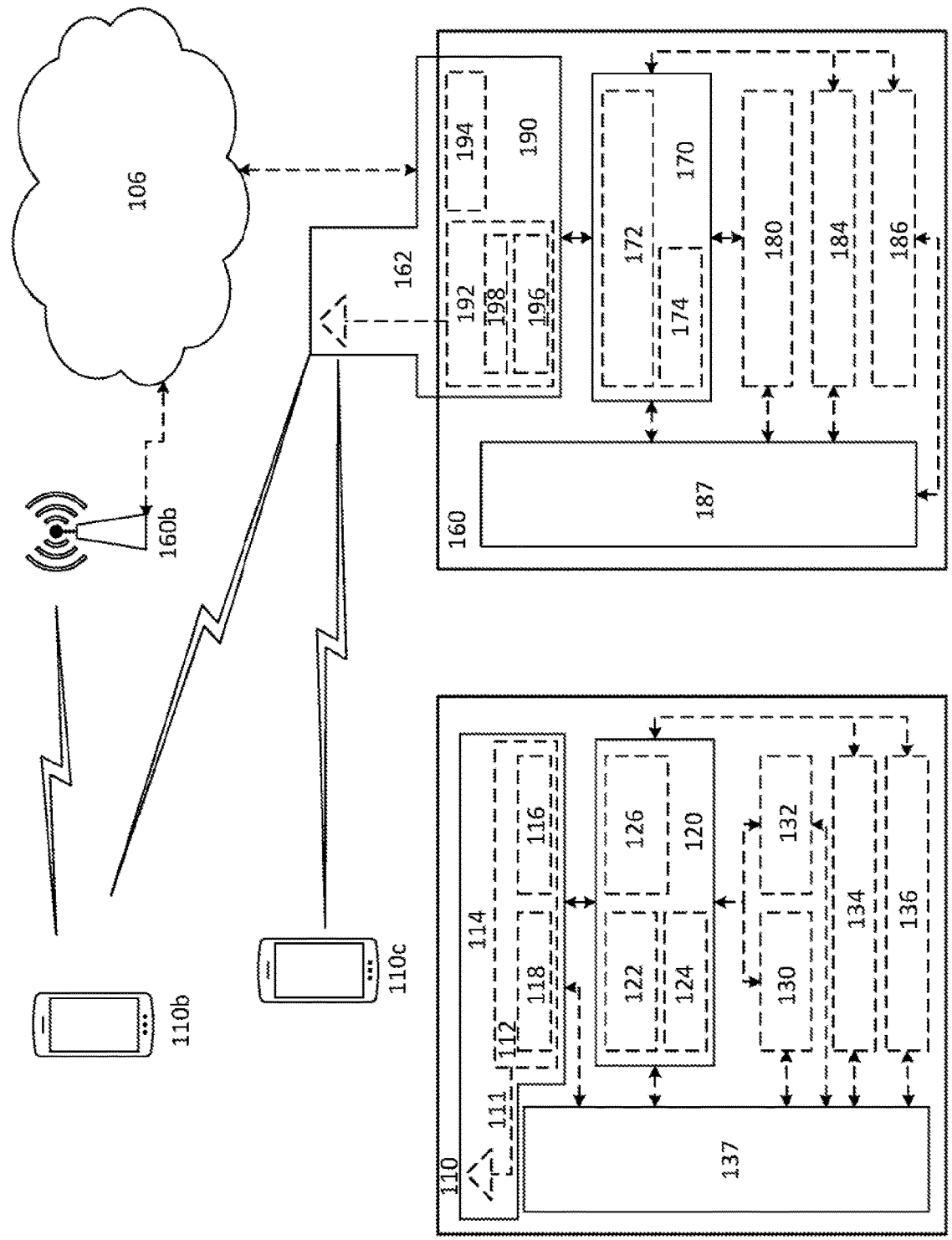
FIG. 5 illustrates an example wireless network, in accordance with certain embodiments.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 160 includes processing circuitry 170, device readable medium 180, interface 190, auxiliary equipment 184, power source 186, power circuitry 187, and antenna 162. Although network node 160 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and an RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 5 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band Internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. Wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 6:
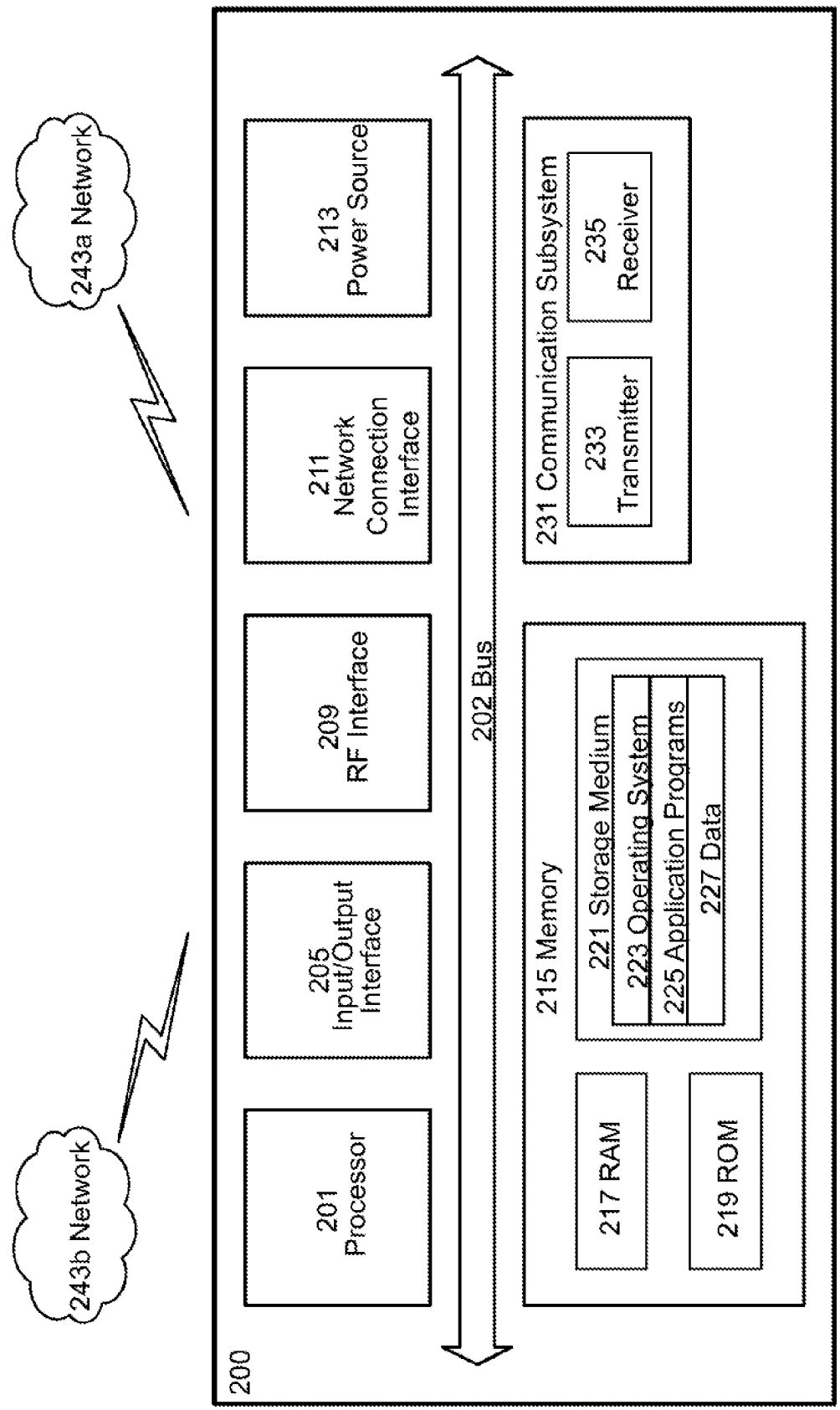
FIG. 6 illustrates an example user equipment, in accordance with certain embodiments.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 6, is one example of a wireless device configured for communication in accordance with one or more communication standards promulgated by the 3$^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 6 is a UE, the components discussed herein are equally applicable to a wireless device, and vice-versa.

In FIG. 6, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 6, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 7:
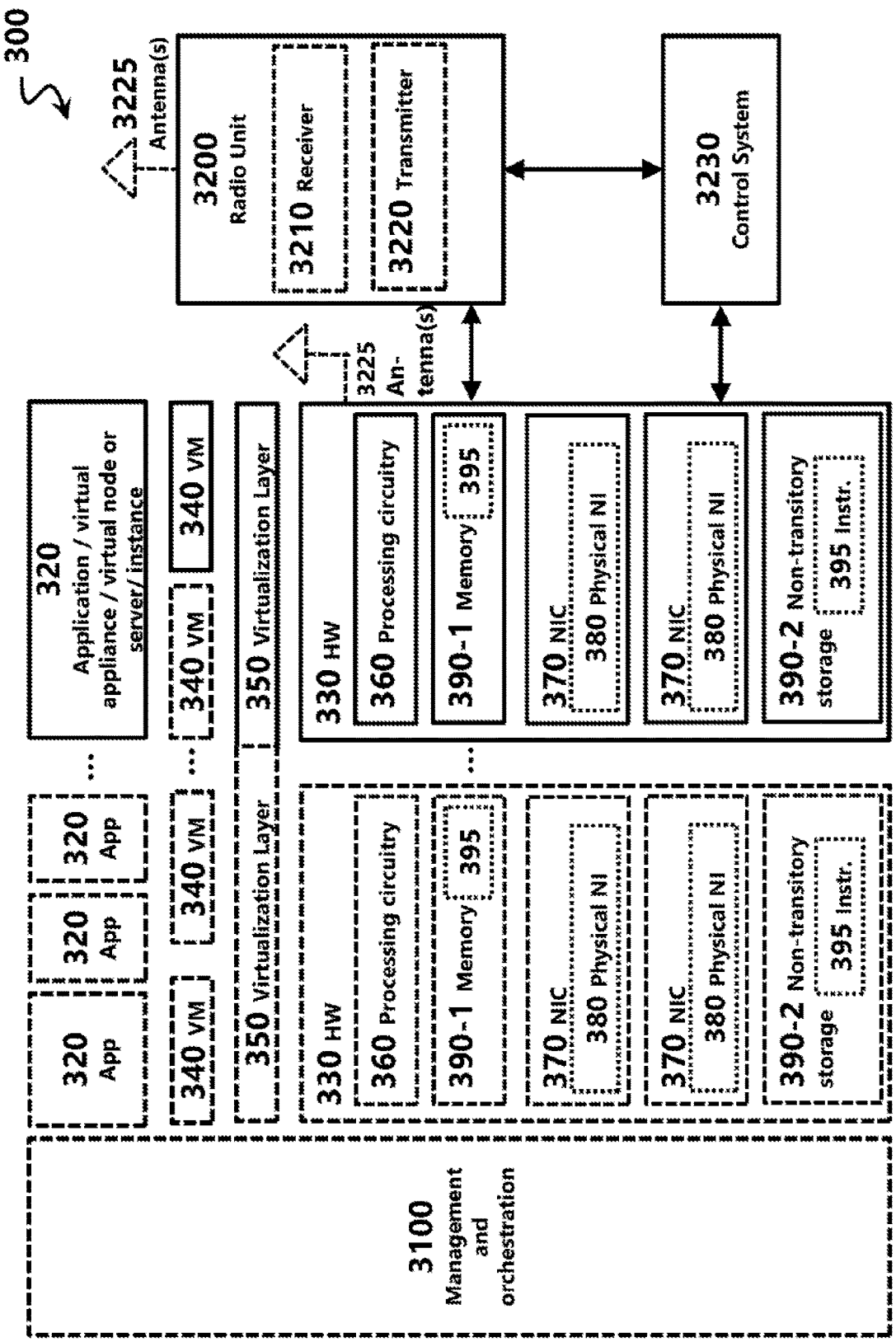
FIG. 7 illustrates an example virtualization environment, in accordance with certain embodiments.

FIG. 7 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 7, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 7.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be affected with the use of control system 3230 which may alternatively be used for communication between the hardware nodes 330 and radio units 3200.

Figure 8:
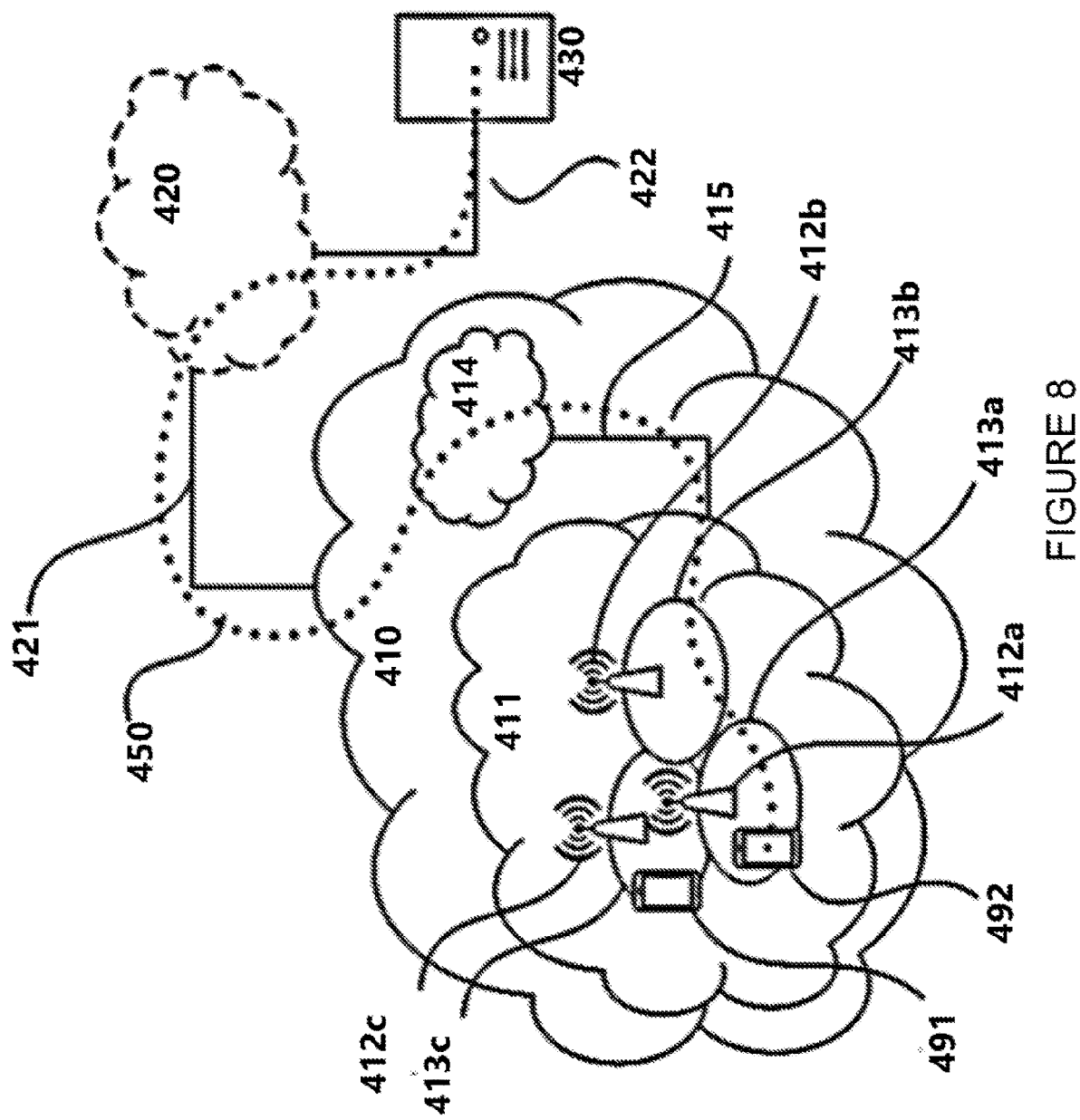
FIG. 8 illustrates an example telecommunication network connected via an intermediate network to a host computer, in accordance with certain embodiments.

With reference to FIG. 8, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 8 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 9. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 9) served by base station 520. Communication interface 526 may be configured to facilitate connection 560 to host computer 510. Connection 560 may be direct or it may pass through a core network (not shown in FIG. 9) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 9:
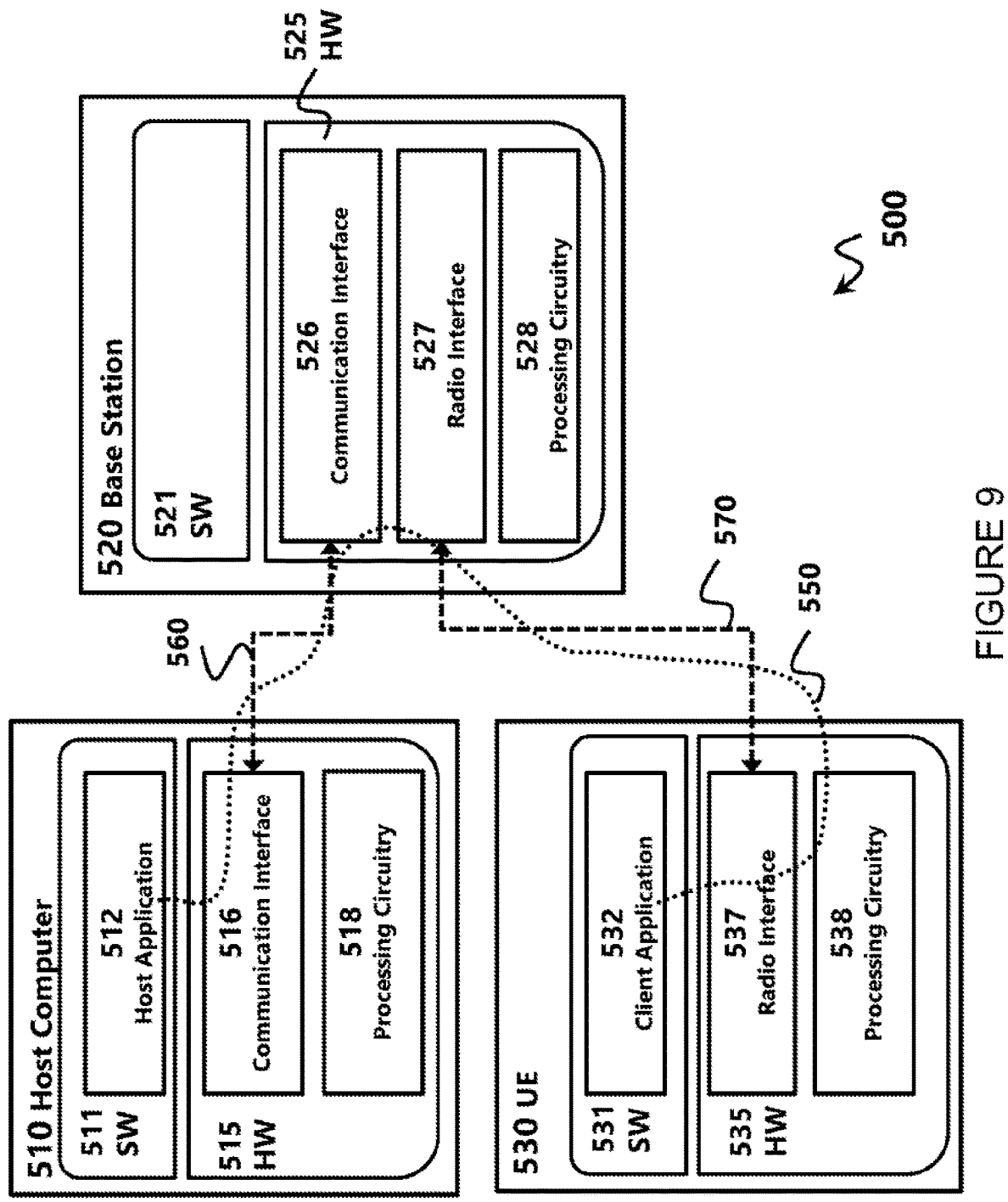
FIG. 9 illustrates an example host computer communicating via a base station with a user equipment over a partially wireless connection, in accordance with certain embodiments.

It is noted that host computer 510, base station 520 and UE 530 illustrated in FIG. 9 may be similar or identical to host computer 430, one of base stations 412a, 412b, 412c and one of UEs 491, 492 of FIG. 8, respectively. This is to say, the inner workings of these entities may be as shown in FIG. 9 and independently, the surrounding network topology may be that of FIG. 8.

In FIG. 9, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and power consumption by enhancing cell selection in NTNs and thereby provide benefits such as reducing user waiting time, increasing network responsiveness, and extending battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 10:
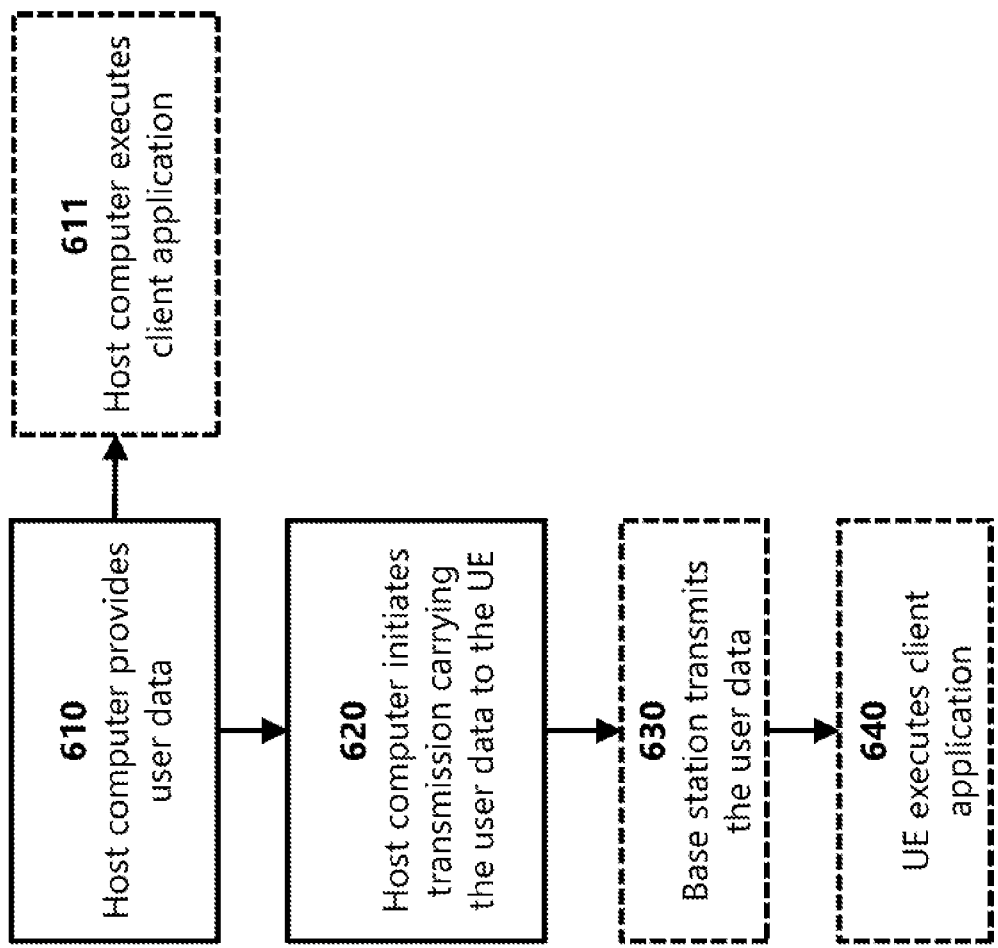
FIG. 10 is a flowchart illustrating an example method implemented in a communication system, in accordance certain embodiments.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 11:
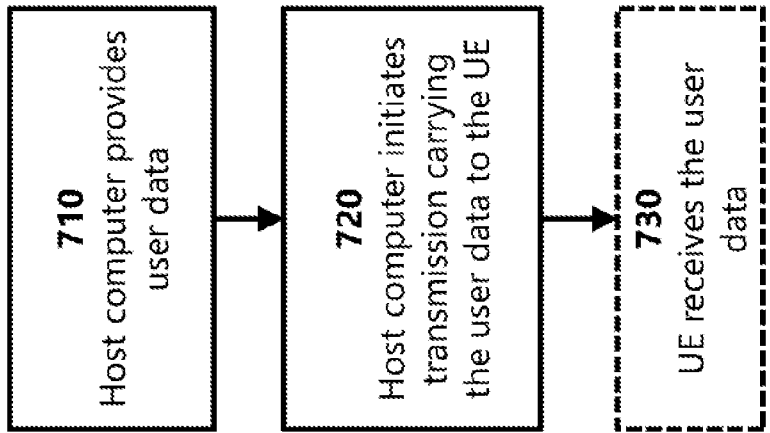
FIG. 11 is a flowchart illustrating a second example method implemented in a communication system, in accordance with certain embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 12:
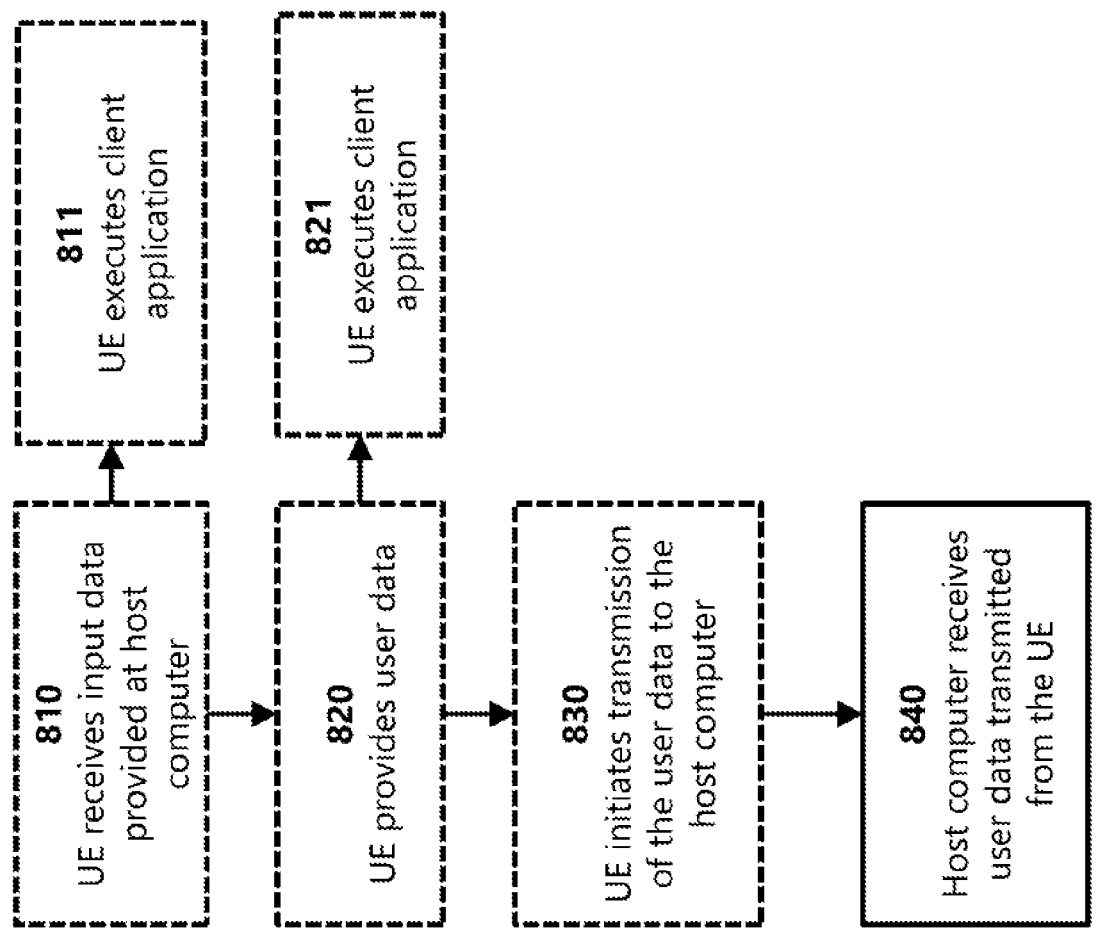
FIG. 12 is a flowchart illustrating a third method implemented in a communication system, in accordance with certain embodiments.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 13:
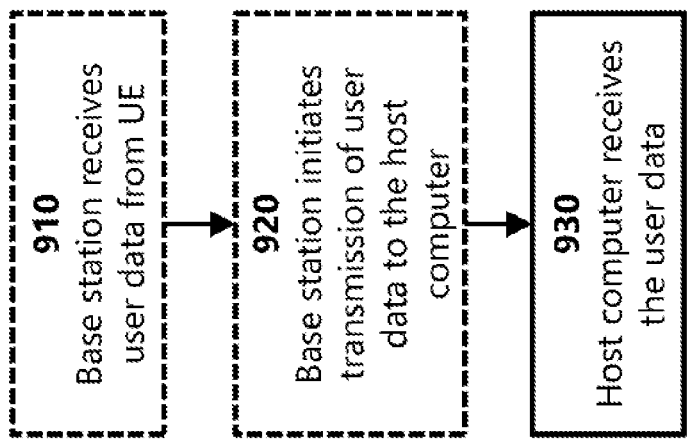
FIG. 13 is a flowchart illustrating a fourth method implemented in a communication system, in accordance with certain embodiments.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 14:
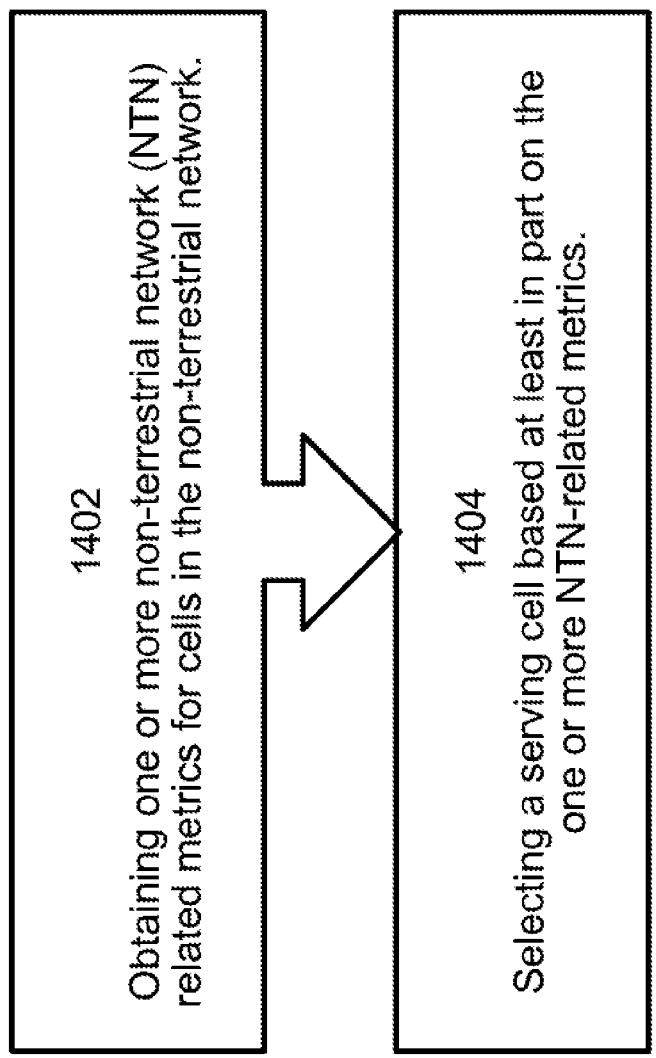
FIG. 14 is a flowchart illustrating an example of a method performed by a wireless device, in accordance with certain embodiments.

FIG. 14 depicts a method in accordance with particular embodiments. In certain embodiments, the method may be performed by a wireless device, such as wireless device 110 or UE 200 described above. The method begins at step 1402 with obtaining one or more non-terrestrial network (NTN) related metrics for cells in the non-terrestrial network. For example, a wireless device may periodically update network information by receiving signalling or broadcasts from neighbouring network nodes associated with one or more cells that the wireless device can select from. This cell information may include information that is related to NTN-related information, such as geographic distances between the wireless device and a reference point associated with the cell, a speed and/or associated Doppler effect of a satellite serving the cell, round trip times or variations of each cell, and any other NTN-related information as described herein. The wireless device may obtain these NTN-related metrics in addition to or alternatively to conventional RSRP and RSRQ information regarding each cell. As described above, in some embodiments, the NTN-related factors may play a larger or the dominant role in determining what is the best cell to be selected and by obtaining NTN-related parameters, the cell selection/reselection may be enhanced for NTNs.

At step 1404, a respective cell is selected as a serving cell based at least in part on the one or more NTN-related metrics. For example, a wireless device may compare each of the one or more NTN-related metrics to corresponding thresholds to determine whether a cell is suitable to be selected and/or if it is the best cell to be selected. For example, a cell may be further considered to be selected if the geographical distance between the wireless device and a location associated with the cell or beam of the cell is below a distance threshold. As another example, a cell may be suitable if an RTT parameter of the cell is less than a longest/highest variation RTT threshold, or if a speed or Doppler parameter of a serving satellite is below a speed measure threshold, or a relative elevation of the satellite to the wireless device is above an elevation angle threshold. Additionally, other metrics may be considered, such as conventional signal quality/strength metrics. For example, the serving cell may be the cell that meets all the NTN-related conditions and has the highest strength. As another example, the thresholds for selecting a new cell may be changed based on one or more NTN-related parameters, e.g., the wireless device may be more hesitant to move to a new cell due to NTN-related factors, which can be represented as an offset.

Accordingly, FIG. 14 illustrates a method for enhancing cell selection in an NTN by incorporating NTN-related parameters into the cell selection process.

FIG. 15 illustrates a schematic block diagram of an apparatus 1500 in a wireless network (for example, the wireless network shown in FIG. 5). In certain embodiments, the apparatus may be implemented in a wireless device, such as wireless device 110 or UE 200 discussed above. Apparatus 1500 is operable to carry out the example method described with reference to FIG. 14 and possibly any other processes or methods disclosed herein. It is also to be understood that the method of FIG. 14 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transceiver unit 1502, cell selection unit 1504, and any other suitable units of apparatus 1500 to perform corresponding functions according one or more embodiments of the present disclosure.

As illustrated in FIG. 15, apparatus 1500 includes transceiver unit 1502 and cell selection unit 1504. Transceiver unit 1502 is configured to communicate with a non-terrestrial network (NTN) via one or more cells. For example, transceiver unit 1502 may be configured to obtain one or more non-terrestrial network (NTN) related metrics for cells in the non-terrestrial network. For example, transceiver unit 1502 may receive signalling or broadcasts from neighbouring network nodes associated with one or more cells that the cell selection unit 1504 can select from. This cell information may include NTN-related information, such as geographic distances between the apparatus 1500 and a reference point associated with the cell, a speed and/or associated Doppler effect of a satellite serving the cell, round trip times or variations of each cell, and any other NTN-related information as described herein. The apparatus 1500 may obtain these NTN-related metrics in addition to or alternatively to conventional RSRP and RSRQ information regarding each cell. As described above, in certain embodiments, the NTN-related factors may play a larger or the dominant role in determining what is the best cell to be selected and by obtaining NTN-related parameters, the cell selection/reselection may be enhanced for NTNs.

Cell selection unit 1504 is configured to select a cell as a serving cell based at least in part on the one or more NTN-related metrics. For example, cell selection unit 1504 may compare each of the one or more NTN-related metrics to corresponding thresholds to determine whether a cell is suitable to be selected and/or if it is the best cell to be selected. For example, a cell may be further considered to be selected if the geographical distance between the apparatus 1500 and a location associated with the cell or beam of the cell is below a distance threshold. As another example, a cell may be suitable if an RTT parameter of the cell is less than a longest/highest variation RTT threshold, or if a speed or Doppler parameter of a serving satellite is below a speed measure threshold, or a relative elevation of the satellite to the apparatus 1500 and/or transceiver unit 1502 is above an elevation angle threshold. Additionally, other metrics may be considered, such as conventional signal quality/strength metrics. For example, the serving cell may be the cell that meets all the NTN-related conditions and has the highest strength. As another example, the thresholds for selecting a new cell may be changed based on one or more NTN-related parameters, e.g., a wireless device may be more hesitant to move to a new cell due to NTN-related factors, which can be represented as an offset.

Accordingly, apparatus 1500 may be configured to have an improved cell selection capability in non-terrestrial networks by incorporating NTN-specific considerations in determining which cell to select or reselect.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Example Embodiments

Group A Embodiments

1. A method performed by a wireless device for cell selection in a non-terrestrial network, the method comprising:

a. obtaining one or more non-terrestrial network (NTN) related metrics for cells in the non-terrestrial network;

b. selecting a respective cell as a serving cell based at least in part on the one or more NTN-related metrics.

2. The method of embodiment 1, further comprising the step of:

a. comparing each of the one or more NTN-related metrics to a corresponding threshold;

b. wherein selecting the serving cell is based on the one or more comparisons.

3. The method of any of the previous embodiments, wherein selecting the serving cell is further based on one or more received signal strength (RSRP) and/or received signal quality (RSRQ) measurements.

4. The method of embodiment 1, wherein the one or more NTN-related metrics comprise one or more of: a geographical distance between the wireless device and a reference point associated with a respective cell; a geographical distance between the wireless device and a reference point associated with an Synchronization Signal Block (SSB) beam of a respective New Radio (NR) cell; a distance between the wireless device and the one or more satellites serving each cell; a round-trip time (RTT) offered by the one or more satellites serving each cell; round-trip time (RTT) variations in each cell; a requirement to pre-compensate the RTT by means of Global Navigation Satellite System (GNSS) measurements; a velocity of the satellite serving each cell; an angle of elevation between the device and the satellite (s) serving each cell; a Doppler shift induced by the satellite serving each cell; a tracking area code broadcasted by the cell; and a signal strength/quality offset.

5. The method of any of the previous embodiments, further comprising:

a. comparing a geographical distance between the wireless device and a reference point associated with a cell or to a satellite serving the cell to a highest acceptable distance; and b. if the geographical distance is less than the highest acceptable distance, determining the cell is suitable for selection as the serving cell.

6. The method of any of the previous embodiments, further comprising:

a. comparing an RTT parameter to a cell to RTT threshold; and b. if the RTT parameter is less than the RTT threshold, determining the cell is suitable for selection as the serving cell.

7. The method of any of the previous embodiments, further comprising:

a. comparing a speed measure of a satellite serving a cell to a speed measure threshold; and b. if the speed measure is below the speed measure threshold, determining the cell is suitable for selection as the serving cell.

8. The method of any of the previous embodiments, further comprising:

a. comparing an elevation angle between a satellite serving a cell and the wireless device to an elevation angle threshold; and b. if the elevation angle is greater than less than the elevation angle threshold, determining the cell is suitable for selection as the serving cell.

9. The method of any of the previous embodiments, wherein the suitability of a cell to be the serving cell is based on whether the wireless device has GNSS capabilities.

10. The method of any of previous embodiments, wherein the selected serving cell is a cell having the strongest signal strength that has one or more suitable non-terrestrial network parameters.

11. The method of any of the previous embodiments, wherein the selected serving cell is the cell that either:

a. supports the shortest distance to a reference point associated with the cell or to a satellite serving the cell b. has the lowest RTT or the lowest RTT variation within the cell c. has the lowest satellite speed, the highest angle of elevation, and/or lowest Doppler effect induced by a satellite serving the cell.

12. The method of any of the previous embodiments, further comprising:

providing user data; and forwarding the user data to a host computer via the transmission to the base station.

Group B Embodiments

13. A method performed by a base station for cell selection in a non-terrestrial network, the method comprising:

a. determining one or more non-terrestrial network (NTN) related metrics for one or more cells associated with the base station in the non-terrestrial network; and b. transmitting the one or more non-terrestrial network (NTN) related metrics to a wireless device.

14. The method of embodiment 1, further comprising serving the wireless device via a cell that the wireless device selects based at least in part on the one or more NTN-related metrics.

15. The method of any of the previous embodiments, providing the wireless device with one or more thresholds corresponding to one or more of the transmitted one or more NTN-related metrics, wherein the one or more thresholds enable the wireless device to select a cell based at least in part on whether a respective NTN-related metric is above or below the respective threshold.

16. The method of any of the previous embodiments, further comprising transmitting one or more reference signals that enable the wireless device to determine a received signal strength (RSRP) and/or received signal quality (RSRQ) measurement and to use the RSRP and/or RSRQ together with one or more of the NTN-related metrics when performing cell selection.

17. The method of any of the previous embodiments, further comprising providing an indication to the wireless device to consider the one or more non-terrestrial network (NTN) related metrics in selecting a cell.

18. The method of embodiment 1, wherein the one or more NTN-related metrics comprise one or more of: a geographical distance between the wireless device and a reference point associated with a respective cell; a geographical distance between the wireless device and a reference point associated with an Synchronization Signal Block (SSB) beam of a respective New Radio (NR) cell; a distance between the wireless device and the one or more satellites serving each cell; a round-trip time (RTT) offered by the one or more satellites serving each cell; round-trip time (RTT) variations in each cell; a requirement to pre-compensate the RTT by means of Global Navigation Satellite System (GNSS) measurements; a velocity of the satellite serving each cell; an angle of elevation between the device and the satellite(s) serving each cell; a Doppler shift induced by the satellite serving each cell; a tracking area code broadcasted by the cell; and a signal strength/quality offset.

19. The method of embodiment 1, wherein the one or more NTN-related metrics are configured for each cell, for each paging area, for each system information validity area, or for each public land mobile network (PLMN).

20. The method of any of the previous embodiments, wherein the suitability of a cell to be the serving cell is based on whether the wireless device has GNSS capabilities.

21. The method of any of previous embodiments, wherein the selected serving cell is a cell having the strongest signal strength that has one or more suitable NTN-related parameters.

22. The method of any of the previous embodiments, wherein the base station is communicatively coupled to a satellite network with bent pipe transponders.

23. The method of any of the previous embodiments, wherein the base station is incorporated into a satellite in a non-terrestrial network.

24. The method of any of the previous embodiments, further comprising:
   obtaining user data; and
   forwarding the user data to a host computer or a wireless device.

Group C Embodiments

25. A wireless device, the wireless device comprising:
   processing circuitry configured to perform any of the steps of any of the Group A embodiments; and
   power supply circuitry configured to supply power to the wireless device.

26. A base station, the base station comprising:
   processing circuitry configured to perform any of the steps of any of the Group B embodiments;
   power supply circuitry configured to supply power to the base station.

27. A user equipment (UE), the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.

28. A computer program, the computer program comprising instructions which when executed on a computer perform any of the steps of any of the Group A embodiments.

29. A computer program product comprising a computer program, the computer program comprising instructions which when executed on a computer perform any of the steps of any of the Group A embodiments.

30. A non-transitory computer-readable storage medium or carrier comprising a computer program, the computer program comprising instructions which when executed on a computer perform any of the steps of any of the Group A embodiments.

31. A computer program, the computer program comprising instructions which when executed on a computer perform any of the steps of any of the Group B embodiments.

32. A computer program product comprising a computer program, the computer program comprising instructions which when executed on a computer perform any of the steps of any of the Group B embodiments.

33. A non-transitory computer-readable storage medium or carrier comprising a computer program, the computer program comprising instructions which when executed on a computer perform any of the steps of any of the Group B embodiments.

34. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B embodiments.

35. The communication system of the pervious embodiment further including the base station.

36. The communication system of the previous 2 embodiments, further including the UE, wherein the UE is configured to communicate with the base station.

37. The communication system of the previous 3 embodiments, wherein:
   the processing circuitry of the host computer is configured to execute a host application, thereby providing the user data; and
   the UE comprises processing circuitry configured to execute a client application associated with the host application.

38. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of the Group B embodiments.

39. The method of the previous embodiment, further comprising, at the base station, transmitting the user data.

40. The method of the previous 2 embodiments, wherein the user data is provided at the host computer by executing a host application, the method further comprising, at the UE, executing a client application associated with the host application.
41. A user equipment (UE) configured to communicate with a base station, the UE comprising a radio interface and processing circuitry configured to performs the of the previous 3 embodiments.
42. A communication system including a host computer comprising:
    processing circuitry configured to provide user data; and
    a communication interface configured to forward user data to a cellular network for transmission to a user equipment (UE),
    wherein the UE comprises a radio interface and processing circuitry, the UE's components configured to perform any of the steps of any of the Group A embodiments.
43. The communication system of the previous embodiment, wherein the cellular network further includes a base station configured to communicate with the UE.
44. The communication system of the previous 2 embodiments, wherein:
    the processing circuitry of the host computer is configured to execute a host application, thereby providing the user data; and
    the UE's processing circuitry is configured to execute a client application associated with the host application.
45. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the UE performs any of the steps of any of the Group A embodiments.
46. The method of the previous embodiment, further comprising at the UE, receiving the user data from the base station.
47. A communication system including a host computer comprising:
    communication interface configured to receive user data originating from a transmission from a user equipment (UE) to a base station,
    wherein the UE comprises a radio interface and processing circuitry, the UE's processing circuitry configured to perform any of the steps of any of the Group A embodiments.
48. The communication system of the previous embodiment, further including the UE.
49. The communication system of the previous 2 embodiments, further including the base station, wherein the base station comprises a radio interface configured to communicate with the UE and a communication interface configured to forward to the host computer the user data carried by a transmission from the UE to the base station.
50. The communication system of the previous 3 embodiments, wherein:
    the processing circuitry of the host computer is configured to execute a host application; and
    the UE's processing circuitry is configured to execute a client application associated with the host application, thereby providing the user data.
51. The communication system of the previous 4 embodiments, wherein:
    the processing circuitry of the host computer is configured to execute a host application, thereby providing request data; and
    the UE's processing circuitry is configured to execute a client application associated with the host application, thereby providing the user data in response to the request data.
52. A method implemented in a communication system including a host computer, a base station and a user equipment (UE), the method comprising:
    at the host computer, receiving user data transmitted to the base station from the UE, wherein the UE performs any of the steps of any of the Group A embodiments.
53. The method of the previous embodiment, further comprising, at the UE, providing the user data to the base station.
54. The method of the previous 2 embodiments, further comprising:
    at the UE, executing a client application, thereby providing the user data to be transmitted; and
    at the host computer, executing a host application associated with the client application.
55. The method of the previous 3 embodiments, further comprising:
    at the UE, executing a client application; and
    at the UE, receiving input data to the client application, the input data being provided at the host computer by executing a host application associated with the client application,
    wherein the user data to be transmitted is provided by the client application in response to the input data.
56. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
57. The communication system of the previous embodiment further including the base station.
58. The communication system of the previous 2 embodiments, further including the UE, wherein the UE is configured to communicate with the base station.
59. The communication system of the previous 3 embodiments, wherein:
    the processing circuitry of the host computer is configured to execute a host application;
    the UE is configured to execute a client application associated with the host application, thereby providing the user data to be received by the host computer.
60. A method implemented in a communication system including a host computer, a base station and a user equipment (UE), the method comprising:
    at the host computer, receiving, from the base station, user data originating from a transmission which the base station has received from the UE, wherein the UE performs any of the steps of any of the Group A embodiments.
61. The method of the previous embodiment, further comprising at the base station, receiving the user data from the UE.
62. The method of the previous 2 embodiments, further comprising at the base station, initiating a transmission of the received user data to the host computer.

Certain embodiments throughout this disclosure have described methods of selecting a first cell of a plurality of cells. In general, referring to a cell as a "first" cell is simply for purposes of explanation, for example, to indicate a particular cell or distinguish one of the cells from the other cells. In general, referring to a cell as a "first" cell does not imply any particular order, unless the context indicates otherwise. For example, as described above, certain embodiments use one or more NTN-related metrics to determine which cells of the plurality of cells are suitable for selection as the cell for camping. If the NTN-related metrics associated with the first cell are determined to be suitable for selection as the cell for camping, the first cell may be included in a group of one or more suitable cells. Different embodiments may use different criteria for selecting the first cell as the cell for camping from among the group of one or more suitable cells. In one embodiment, the first cell is selected from the group of one or more suitable cells based on the first cell having the strongest signal strength, regardless of whether the first cell was the first, second, or other cell determined to be suitable for selection. Thus, in this example, referring to the cell as the "first" cell does not imply any particular order. By contrast, in another embodiment, the first cell is selected from the group of one or more suitable cells based on the first cell being the first of the one or more cells determined to be suitable for selection as the cell for camping. In this example, the order in which the one or more cells are determined to be suitable for selection effects which cell is selected, so the first cell/selected cell refers to the first in time for purposes of this one embodiment.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the following claims.

The invention claimed is:

1. A method performed by a wireless device, the method comprising:
   obtaining one or more non-terrestrial network (NTN)-related metrics for each of a plurality of cells in the NTN;
   selecting first cell of the plurality of cells as a cell for camping based at least in part on the one or more NTN-related metrics;
   comparing an RTT parameter associated with the first cell to an RTT threshold; and
   selecting the first cell as the cell for camping based at least in part on determining that the RTT parameter associated with the first cell is less than the RTT threshold,
   wherein the one or more NTN-related metrics comprise one or more of: a geographical distance between the wireless device and a reference point associated with a respective cell; a geographical distance between the wireless device and a reference point associated with an Synchronization Signal Block (SSB) beam of a respective New Radio (NR) cell; a distance between the wireless device and one or more satellites serving each cell; a round-trip time (RTT) offered by the one or more satellites serving each cell; round-trip time (RTT) variations in each cell; a requirement to pre-compensate the RTT by means of Global Navigation Satellite System (GNSS) measurements; a velocity of the satellite serving each cell; an angle of elevation between the device and the one or more satellites serving each cell; a Doppler shift induced by the satellite serving each cell; a tracking area code broadcasted by the cell; and a signal strength/quality offset.

2. The method of claim 1, wherein selecting the first cell as the cell for camping is further based on at least one of: one or more received signal strength (RSRP) measurements or one or more received signal quality (RSRQ) measurements.

3. The method of claim 1, wherein selecting the first cell as the cell for camping further comprises:
   comparing the geographical distance between the wireless device and a reference point associated with the first cell to a maximum acceptable distance; and
   selecting the first cell as the cell for camping based at least in part on determining that the geographical distance between the wireless device and the reference point associated with the first cell is less than the maximum acceptable distance.

4. The method of claim 1, wherein selecting the first cell as the cell for camping further comprises:
   comparing the geographical distance between the wireless device and a satellite serving the first cell to a maximum acceptable distance; and
   selecting the first cell as the cell for camping based at least in part on determining that the geographical distance between the wireless device and the satellite serving the first cell is less than the maximum acceptable distance.

5. The method of claim 1, wherein selecting the first cell as the cell for camping further comprises:
   comparing a speed measure of a satellite serving the first cell to a speed measure threshold; and
   selecting the first cell as the cell for camping based at least in part on determining that the speed measure of the satellite serving the first cell is below the speed measure threshold.

6. The method of claim 1, wherein selecting the first cell as the cell for camping further comprises:
   comparing an elevation angle between a satellite serving the first cell and the wireless device to an elevation angle threshold; and
   selecting the first cell as the cell for camping based at least in part on determining that the elevation angle between the satellite serving the first cell and the wireless device is greater than the elevation angle threshold.

7. The method of claim 1, wherein selecting the first cell as the cell for camping further comprises:
   using the one or more NTN-related metrics to determine which cells of the plurality of cells are suitable for selection as the cell for camping; and selecting the first cell as the cell for camping based on the first cell having the strongest signal strength of the cells that are suitable for selection as the cell for camping.

8. The method of claim 1, wherein selecting the first cell as the cell for camping further comprises:
using the one or more NTN-related metrics to determine one or more cells suitable for selection as the cell for camping; and
selecting the first cell as the cell for camping based on the first cell being the first of the one or more cells determined to be suitable for selection as the cell for camping.

9. A wireless device, the wireless device comprising:
power supply circuitry configured to supply power to the wireless device; and
processing circuitry to:
obtain one or more non-terrestrial network (NTN)-related metrics for each of a plurality of cells in the NTN;
select a first cell of the plurality of cells as a cell for camping based at least in part on the one or more NTN-related metrics;
compare an RTT parameter associated with the first cell to an RTT threshold; and
select the first cell as the cell for camping based at least in part on determining that the RTT parameter associated with the first cell is less than the RTT threshold,
wherein the one or more NTN-related metrics comprise one or more of: a geographical distance between the wireless device and a reference point associated with a respective cell; a geographical distance between the wireless device and a reference point associated with an Synchronization Signal Block (SSB) beam of a respective New Radio (NR) cell; a distance between the wireless device and one or more satellites serving each cell; a round-trip time (RTT) offered by the one or more satellites serving each cell; round-trip time (RTT) variations in each cell; a requirement to pre-compensate the RTT by means of Global Navigation Satellite System (GNSS) measurements; a velocity of the satellite serving each cell; an angle of elevation between the device and the one or more satellites serving each cell; a Doppler shift induced by the satellite serving each cell; a tracking area code broadcasted by the cell; and a signal strength/quality offset.

10. The wireless device of claim 9, wherein the processing circuitry is further configured to select the first cell as the cell for camping based on at least one of: one or more received signal strength (RSRP) measurements or one or more received signal quality (RSRQ) measurements.

11. The wireless device of claim 9, wherein to select the first cell as the cell for camping, the processing circuitry is further configured to:
compare the geographical distance between the wireless device and a reference point associated with the first cell to a maximum acceptable distance; and
select the first cell as the cell for camping based at least in part on determining that the geographical distance between the wireless device and the reference point associated with the first cell is less than the maximum acceptable distance.

12. The wireless device of claim 9, wherein to select the first cell as the cell for camping, the processing circuitry is further configured to:
compare the geographical distance between the wireless device and a satellite serving the first cell to a maximum acceptable distance; and select the first cell as the cell for camping based at least in part on determining that the geographical distance between the wireless device and the satellite serving the first cell is less than the maximum acceptable distance.

13. The wireless device of claim 9, wherein selecting the first cell as the cell for camping further comprises:
compare a speed measure of a satellite serving the first cell to a speed measure threshold; and
select the first cell as the cell for camping based at least in part on determining that the speed measure of the satellite serving the first cell is below the speed measure threshold.

14. The wireless device of claim 9, wherein to select the first cell as the cell for camping, the processing circuitry is further configured to:
compare an elevation angle between a satellite serving the first cell and the wireless device to an elevation angle threshold; and
select the first cell as the cell for camping based at least in part on determining that the elevation angle between the satellite serving the first cell and the wireless device is greater than the elevation angle threshold.

15. The wireless device of claim 9, wherein to select the first cell as the cell for camping, the processing circuitry is further configured to:
use the one or more NTN-related metrics to determine which cells of the plurality of cells are suitable for selection as the cell for camping; and
select the first cell as the cell for camping based on the first cell having the strongest signal strength of the cells that are suitable for selection as the cell for camping.

16. The wireless device of claim 9, wherein to select the first cell as the cell for camping, the processing circuitry is further configured to:
use the one or more NTN-related metrics to determine one or more cells suitable for selection as the cell for camping; and
select the first cell as the cell for camping based on the first cell being the first of the one or more cells determined to be suitable for selection as the cell for camping.

17. The wireless device of claim 9, wherein to select the first cell as the cell for camping, the processing circuitry is further configured to compare the one or more NTN-related metrics associated with the first cell to the one or more NTN-related metrics associated with the other cells using the same carrier frequency as the first cell of the plurality of cells and determine that the one or more NTN-related metrics associated with the first cell satisfy at least one of the following:
shortest distance to a reference point associated with the cell;
shortest distance to a satellite serving the cell;
lowest RTT;
lowest RTT variation within the cell;
lowest satellite speed;
highest angle of elevation; or
lowest Doppler effect induced by a satellite serving the cell.

18. A computer program product comprising a non-transitory computer-readable medium storing computer program instructions that, when executed on a computer, cause the computer to perform a method comprising:
obtaining one or more non-terrestrial network (NTN)-related metrics for each of a plurality of cells in the NTN;

selecting a first cell of the plurality of cells as a cell for camping based at least in part on the one or more NTN-related metrics;
comparing an RTT parameter associated with the first cell to an RTT threshold; and
selecting the first cell as the cell for camping based at least in part on determining that the RTT parameter associated with the first cell is less than the RTT threshold,
wherein the one or more NTN-related metrics comprise one or more of: a geographical distance between the wireless device and a reference point associated with a respective cell; a geographical distance between the wireless device and a reference point associated with an Synchronization Signal Block (SSB) beam of a respective New Radio (NR) cell; a distance between the wireless device and one or more satellites serving each cell; a round-trip time (RTT) offered by the one or more satellites serving each cell; round-trip time (RTT) variations in each cell; a requirement to pre-compensate the RTT by means of Global Navigation Satellite System (GNSS) measurements; a velocity of the satellite serving each cell; an angle of elevation between the device and the one or more satellites serving each cell; a Doppler shift induced by the satellite serving each cell; a tracking area code broadcasted by the cell; and a signal strength/quality offset.

* * * * *